United States Patent [19]

Tattersall

[11] Patent Number: 5,175,794
[45] Date of Patent: Dec. 29, 1992

[54] PATTERN RECOGNITION OF TEMPORALLY SEQUENCED SIGNAL VECTORS

[75] Inventor: Graham D. Tattersall, Friston, England

[73] Assignee: British Telecommunications public limited company, London, England

[21] Appl. No.: 359,746
[22] PCT Filed: Aug. 26, 1988
[86] PCT No.: PCT/GB88/00710
  § 371 Date: May 9, 1989
  § 102(e) Date: May 9, 1989
[87] PCT Pub. No.: WO89/02134
  PCT Pub. Date: Mar. 9, 1989

[30] Foreign Application Priority Data

Aug. 28, 1987 [GB] United Kingdom ......... 8720387

[51] Int. Cl.$^5$ ............................. G01L 9/14
[52] U.S. Cl. ............................. 395/2
[58] Field of Search ............... 381/41–45; 382/14–15; 395/2

[56] References Cited

U.S. PATENT DOCUMENTS

| | | | |
|---|---|---|---|
| 3,287,649 | 11/1966 | Rosenblatt | 381/43 |
| 3,845,471 | 10/1974 | Reitboeck | 340/149 |
| 4,119,946 | 10/1978 | Taylor | 340/146.3 |
| 4,254,474 | 3/1981 | Cooper et al. | 364/900 |
| 4,773,024 | 9/1988 | Faggin et al. | 364/513 |
| 4,805,225 | 2/1989 | Clark | 382/15 |

FOREIGN PATENT DOCUMENTS

| | | |
|---|---|---|
| 0014926 | 9/1980 | European Pat. Off. . |
| 0085545 | 8/1983 | European Pat. Off. . |
| 0186150 | 7/1986 | European Pat. Off. . |
| 0245508 | 5/1987 | European Pat. Off. . |
| 62-02805 | 5/1987 | Japan . |
| 1192554 | 5/1970 | United Kingdom . |

OTHER PUBLICATIONS

Transactions of the I.R.E., Professional Group on Information Theory, No. 4, "Simulation of Self-Organizing Systems by Digital Computer" Farley, B. G. and Clark, W. A., Sep. 1954, pp. 76–84.

L'Electricité Electronique Moderne, vol. 42, No. 265, Jun./Jul. 1972, B. H. Marin, "Le neurone cybernétique", pp. 21–25.

Electronics Letters, vol. 4, No. 20, Oct. 4, 1968, I. Aleksander et al. "Microcircuit lerning nets: improved recognition by means of pattern feedback" pp. 425–469.

Pattern Recognition, vol. 15, No. 6, 1982, Pattern Recognition Society, K. Fukushima et al. "Neocognitron: a new algorithm for pattern recognition tolerant of deformations and shifts in position" pp. 455–469.

IEEE Transactions on Computers, vol. 20, No. 9, Sep. 1971, L. C. W. Pols "Real-time recognition of Spoken words" pp. 972–978.

IEEE Journal of Solid-State Circuits, vol. SC-1, No. 2, Dec. 1966, J. W. McConnell et al. "MOS adaptive memory elements as weights in adaptive pattern classifier" pp. 94–99.

IEEE Proceedings of the 6th International Conference on Pattern Recognition, Oct. 1982, T. Kohonen, "Clustering, taxonomy, and topological maps of patterns" p. 18.

IEEE Acoustics, Speech, and Signal Processing Society, Apr. 1987, R. P. Lippmann, "An Introduction to Computing with Neural Nets" pp. 4–22.

Kybernetik, vol. 16, No. 2, 1974, pp. 103–112; H. Wigstrom: "A model of a neutral network with recurrent inhibition".

Systems, Computers, Controls, vol. 6, No. 5, 1975, pp. 15–22; K. Fukushima: "Self-organizing multilayered neural network".

British Telecom Technology Journal, vol. 6, No. 2, Apr. 1988, G. D. Tattersall et al: "Neural arrays for speech recognition", pp. 140–163.

Primary Examiner—Michael R. Fleming
Assistant Examiner—Michelle Doerrler
Attorney, Agent, or Firm—Nixon & Vanderhye

[57] ABSTRACT

A temporal sequence of signal vectors X (e.g., generated from a speech signal) is supplied in parallel to elements in an array each of which (after training of the array) provide an output $\eta$ indicating the vector's similarity to a reference vector. Persistence is built into the elements so that signals forming a "trajectory" within the array, corresponding to an input sequence are simultaneously available for recognition (preferably by a further such array). Arrays may be cascaded to allow for longer sequences.

32 Claims, 8 Drawing Sheets ced signal. Thus, the magnitude of the input vector could vary widely for what is essentially the same input. In order to cope with this, one preferred approach is to have each comparison element respond to changes in the direction of the input vector rather than to changes in its magnitude.

PATTERN RECOGNITION OF TEMPORALLY SEQUENCED SIGNAL VECTORS

BACKGROUND OF THE INVENTION

1. Field of the Invention

The invention relates to methods and apparatus for pattern recognition, and particularly, though not exclusively, speech recognition.

The invention is particularly concerned with monitoring temporal sequences of input vectors so as to recognise particular patterns.

2. Description of Related Art

In this specification, an "N dimensional vector" comprises a group of N values, each value corresponding to a respective dimension of the vector. The values may be represented by analogue signals or digitally. Such a vector has a magnitude which may be, for example, defined by the square root of the sum of the squares of the values, and also a direction in N dimensional space. For simplicity, throughout this specification, scalar quantities (except for N) will be represented by lower case letters, and vector quantities by upper case letters.

Vectors of this type can in particular be derived from an analysis of human speech. Thus, an analogue signal representing a series of speech sounds can be regularly sampled and the content of each sample can be represented in terms of a vector comprising a set of feature values corresponding, for example, to the amplitude of respective frequencies within the sample.

A paper entitled "Clustering, Taxonomy, and Topological Maps of Patterns" by T. Kohonen in Proceedings of the Sixth International Conference on Pattern Recognition, October 1982, pages 114-128 describes an approach for the statistical representation of empirical data. Sets (vectors) of input data are successively applied, in parallel to each of a number of processing units regarded as forming a two-dimensional array; each unit produces a single output proportional to the degree of matching between the particular input vector and an internal vector associated with that unit. An adaptation principle is defined so that a succession of input vectors, which form a statistical representation of the input data, cause changes in the internal vectors. This works (for each input vector) by:

(1) identifying the unit whose reference vector is most similar to the input (eg the smallest Euclidean distance);
(2) defining a neighbourhood within the array, around this unit;
(3) changing the internal vectors of those units belonging to this neighbourhood; the direction of change being such that the similarity of those internal vectors is increased.

As this 'self-organisation' process proceeds, the size of the neighbourhood is progressively reduced; the magnitude of the adjustments may also decrease. At the conclusion of this process, the array internal vectors define a mapping of the input vector space onto the two-dimensional space. Kohonen trained such an array using manually-selected speech samples of certain stationary Finnish vowel phonemes (selected to exclude those including transients), the input vectors each consisting of fifteen spectral values, and found that it mapped the phonemes into the two-dimensional array space.

SUMMARY OF THE INVENTION

According to one aspect of the present invention, there is provided a pattern recognition apparatus comprising:

an input for receiving a temporal sequence of input signal vectors;

store means for storing a plurality of reference vectors;

plurality of comparison elements arranged in operation to receive the same, current, value of the input vector and to generate an output signal indicative of the degree of similarity between the input vector and a respective one of the reference vectors;

means for producing for each element an output modified in dependence on the output signal produced by that element as a result of a comparison between its reference vector and at least the immediately preceding input vector; and recognition means for comparing the pattern represented by those of the said modified outputs which indicate a relatively high similarity between the input and reference vectors with reference information to identify patterns represented by the said temporal sequence.

This enables the path through the "most similar reference vectors" corresponding to a series of input vectors to be relatively easily determined by building in a certain degree of persistence in the output signals generated for each reference vector. Thus, at any sampling period instant, although the most similar reference vector may have changed, output signals of a significant magnitude will also be generated as a result of the comparison of a preceding input vector with at least one of the other reference vectors.

Although in principle the recognition means could employ a conventional pattern recognition method to determine from the output signals generated an identity for the stimulus leading to the series of input vectors, it is preferred that the apparatus further comprises at least one further array of such comparison elements having respective stored reference vectors, each of such elements being connected to receive a respective group of the modified (or further modified) outputs of the or a preceding array so as to generate an output signal indicative of the similarity between its reference vector and the said group of outputs.

Preferably, the group of output signals corresponding to each reference vector of the, or one of the, higher arrays is derived from the output signals generated by locations in the preceding array centred on a location in the preceding array corresponding to the location of the reference vector in the one array.

In a further refinement of the multilayer method, the output signals generated by at least one of the arrays are fed back so as to modify the groups of signals fed to the preceding array. This type of feedback enables the method to react to high order grammars (in the case of speech recognition such as words, phrases and the like). For example, the fed back signals may be concatenated with the input signals to the preceding array.

There is a considerable complexity in the subsequent recognition of a series of input vectors if the position within the array which is associated with the most similar reference vector changes with the magnitude of the input vector. This causes a considerable problem in the case of speech recognition since the magnitude of the vector is associated with the intensity of the received sound. In other words, if the same phoneme is said loudly or softly, this will result in different "most similar reference vectors" being located. This in turn means that a complex pattern recognition system must be involved to cope with a wide variety of different input vectors being generated for the same phoneme.

We have found that a considerable improvement on the known methods can be achieved by comparing the input vectors and the reference vectors in such a way that the position within the array of the reference vector which is most similar to the input vector does not vary with the magnitude of the input vector. This means that, in the case of speech, regardless of the loudness of the sound, substantially the same reference vector will be found to be the most similar.

In the preferred method, the comparison step comprises determining a function related to the dot product of the input vector and the reference vector. In this case, one (preferably the reference vector) or both of the reference and input vectors is normalised.

This has the consequence that the largest excitation in the array comes from the element whose reference (or weight) vector lies most closely in the same direction as the input vector so that the relative excitation depends solely on sound type and not amplitude. However, the absolute magnitude of the excitation will depend on the magnitude of the input vector X, and so this arrangement gives the desired property of coding sound type by position of maximum excitation and sound magnitude by the intensity of that excitation.

In a modified form of the dot product function, the comparison step comprises determining the function:

$$|X| \cos^m \theta$$

where m = a power greater than unity, X is the magnitude of the input vector, and $\theta$ is the angle between the input and reference vectors. In this case, the reference vectors have unity magnitude.

Although the apparatus has been described conceptually as involving topological arrays of reference vectors, in practice the physical locations of reference vectors need not be in a topological manner but will be mapped in a conventional manner into a topological form.

The term "arrays" will be understood in terms of the connections between elements rather than their physical location.

BRIEF DESCRIPTION OF THE DRAWINGS

Some examples of apparatus in accordance with the present invention will now be described with reference to the accompanying drawings, in which.

DESCRIPTION OF PREFERRED EMBODIMENTS

Figure 1:
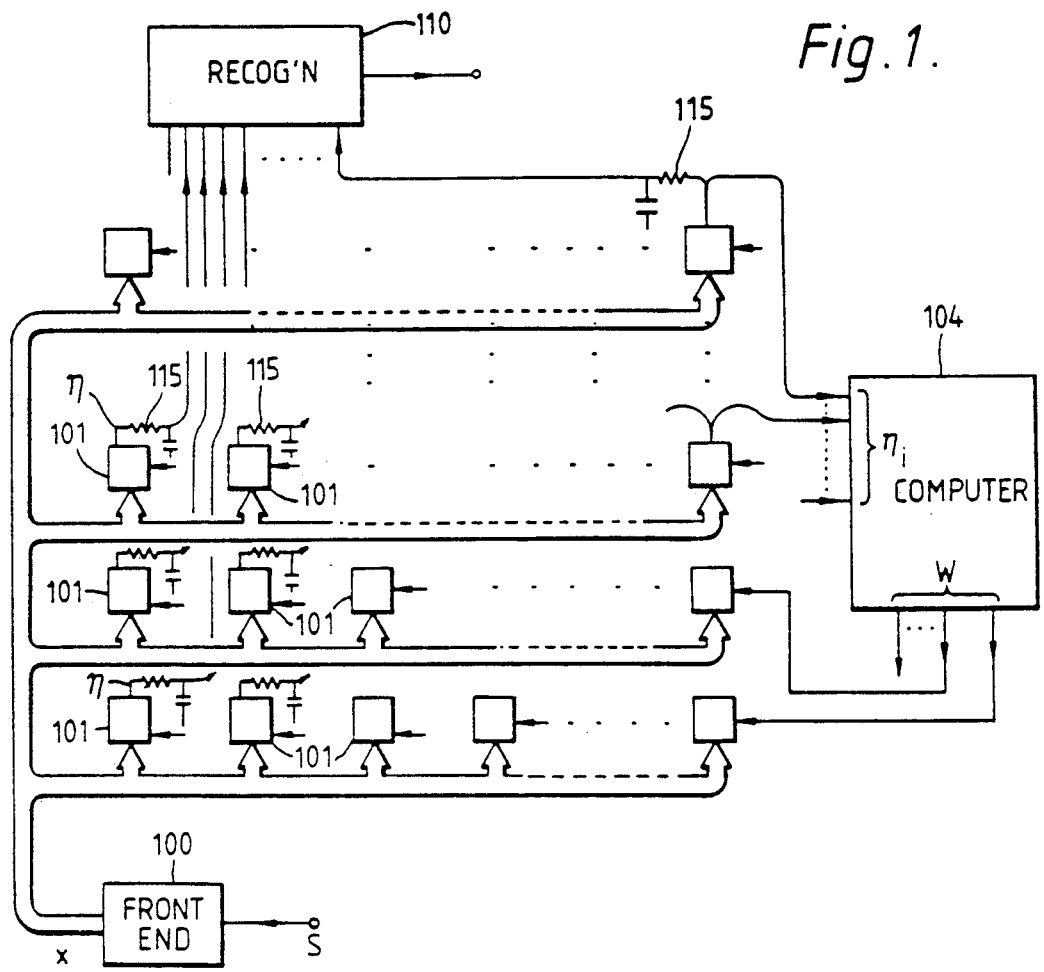
FIG. 1 is a schematic diagram of a first embodiment of recognition apparatus according to the invention.

The apparatus shown in FIG. 1 has a front-end speech processing unit 100. Input speech signals s are divided into frames of, for example, 10 ms duration, and each frame is analysed to generate a plurality of parameters representing characteristics of that frame. One convenient measure is the energy content of successive frequency bands within the total spectrum of the speech, which can readily be generated by transform techniques or even by a bank of band-pass filters. Such feature extraction in general and spectral analysis in particular are well known techniques for speech processing and recognition and will not, therefore, be described further here.

The output of the processing unit consists of a group of N signals (assumed here to be in analogue form), denoted by a vector $X = \{x_1, x_2, \ldots x_N\}$. Typically, N may be 16 or 32. The vectors X generated for successive frames of speech form a temporal sequence of vectors. The purpose of the remainder of the apparatus is to identify patterns (and hence phonemes, words, etc) in this sequence. Although it is described in the context of speech, it will be appreciated that recognition of patterns in other temporal sequences of vectors is also possible. The apparatus also has elements or units 101 set out in a two-dimensional array. The input to the array is supplied simultaneously to all elements of the array. Each element has a single (scalar) analogue output, denoted by $\eta_i$ where i is an index number denoting the particular element. In general, $\eta$ is some function of the input vector X and a weight vector $W_i = (w_{i1}, w_{i2}, \ldots W_{iN})$ associated with that element, such as to indicate the degree of similarity between the two vectors.

Preferably, this function is the dot product, i.e.

$$\eta_i = W_i \cdot X = \sum_{j=1}^{N} w_{ij} * x_j$$

Figure 2:
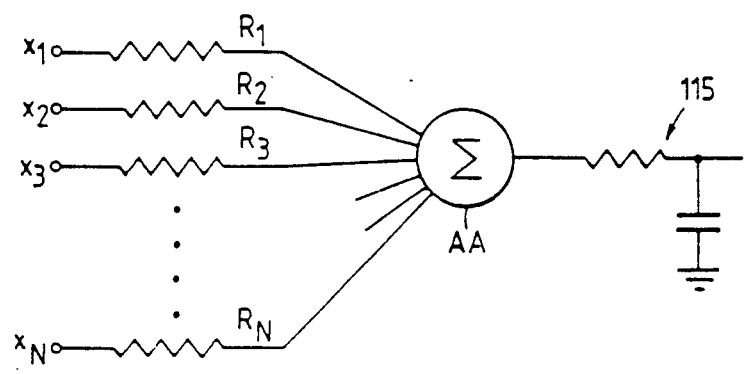
FIG. 2 illustrates the principle of a neuron used in the apparatus, with persistence.

Note that the dot (.) is used to signify a vector dot product and star (*) to indicate a product of scalar quantities. This function may be realised by an element of the form illustrated in FIG. 2, where an amplifier AA forms an output voltage proportional to the sum of the currents in weighting resistors $R_j$ whose values correspond to the reciprocals of stored weights $w_{ij}$ (though a practical element will be more complex owing to the need to adjust the weights). Elements such as those shown in FIG. 2 are often called neurons, by analogy with biological systems, and this term is used in this description.

In order that the array can be taught the statistics of speech data, an auxiliary computer 104 is provided, which has access to the outputs $\eta_i$ of the neurons and is able to change their weight vectors $W_i$. During training, speech is fed to the input processor and each vector X supplied to the array is dealt with in that:

(a) the computer scans the array to identify the neuron with the largest output; and
(b) it calculates, from this output and the existing weight vectors $W_i$, adjustments to be made to the weight vectors of the identified neuron and those adjacent to it in the array.

More specifically, such training may take the following form:
(a) initially, set the weight vectors $W_i$ to random values;
(b) define a neighbourhood in the array around each neuron. The neighbourhood—which may be circular, square, hexagonal, etc.—includes the neuron in question and a number of neighbouring neurons;
(c) take a vector X from the input. Each neuron produces an output $\eta_i$;
(d) identify—e.g. by scanning the neuron outputs—the neuron with the largest output (the "most excited" neuron);
(e) modify the weight vectors of all neurons lying within the neighbourhood centred on the most excited neuron using the algorithm $$W_i' = W_i^n + k * X$$

$$W_i^{n+1} = \frac{W_i'}{|W_i'|}$$

where $W_i^{n+1}$ is the new weight, and $W_i^n$ is the previous weight, k is a gain factor determining the rate of adaptation; $W_i'$ is simply an intermediate term in the calculation;
(e) repeat steps c, d and e for further vectors X.

A modification to this process avoids the necessity of explicitly identifying the most excited neuron, by applying the modification to neurons within the neighbourhood surrounding every neuron, but varying the amount of adjustment according to a non-linear function of the output of the neuron defining the neighbourhood—e.g. the output raised to a high power m.

Thus, if $\eta_j' = \eta_j^m$ then the adjustment to neuron i consequent upon its lying within the neighbourhood of neuron j is:

$$W_i' = W_i^n + k * \eta_j' * X$$

$$W_i^{n+1} = \frac{W_i'}{|W_i'|}$$

In order to avoid confusion, superscripts to a symbol are here defined as denoting which of a succession of values is intended (i.e. $W^{n-1}$ is the previous value of $W^n$): where a quantity raised to a power is intended, this will be specifically stated.

As in Kohonen's work, the rate constant k may be a function of the distance of the neuron in question from the neuron defining the neighbourhood; and it is preferred to reduce the size of the neighbourhood as training progresses.

Note that the normalisation of the weight vector magnitude to unity is an important step in this process, or else the weight vector magnitudes will tend to increase indefinitely, or (in practice) saturate. The normalisation, however, also serves another purpose. The dot product $W_i.X$ may be written as:

$$|W_i| * |X| * \cos\theta$$

where $\theta$ is the angle between the two vectors in N-dimensional space. If $W_i$ is normalised to unity magnitude, we have $$\eta_i = |X| * \cos\theta$$

which is the product of a term ($\cos \theta$) indicating the similarity of the input and weight vectors, irrespective of their absolute magnitude, and a term ($|X|$) which represents the input amplitude. If the outputs of an array of neurons are interpreted by considering their relative values, the result becomes independent of the input signal amplitude since $|X|$ is the same for all neurons.

After the array has been successfully trained, the array is ordered in terms of sound quality and the receipt of an input signal vector by the array will result in each neuron generating an output signal whose degree of excitation varies with the similarity between the input vector and the corresponding weight vector. For any given input vector, only a small group of neurons will generate output signals of any significant magnitude and these will be grouped together within the array. If the array could be viewed from above, and the neurons' output seen as lights of variable intensity, the application of a single input vector would cause a bright "blob" in one part of the array formed by the output signals from the grouped neural elements, the position of the blob being characteristic of the type of sound represented by the input vector.

Furthermore, the relationship between the array positions of the "most excited neurons" for given input vectors will (perhaps surprisingly) tend to map topologically to the relative positions in "pattern" space of those input vectors (that is, in an N-dimensional perceptual space where N is the "inherent dimensionality" of the input data). Vowels, for example, seem to be well represented by a 2-dimensional space; these types of speech data thus have an inherent dimensionality of 2 and are well mapped onto a 2-dimensional neural array.

Note that the physical position of neurons in the array is unimportant—in the untrained array, the neurons are indistinguishable. 'Position' becomes meaningful only because of the definition of 'neighbouring' neurons.

It may be observed that a recognition apparatus may include the auxiliary computer for training, or retraining, but may lack such a computer if it can be loaded with the weights already learned by another machine.

The nature of speech sounds produced during an utterance does not change instantaneously. Consequently, vectors representing successive speech samples taken at intervals of a few milliseconds (for example 16 milliseconds) will be very similar and when applied to the array 1 will tend to cause the high output "blob" to change position by only a small amount. The effect of this is that the application of a series of input vectors representing a complete utterance will cause the blob to move along a trajectory in the array which is characteristic of the utterance. An example of such a trajectory is shown by the line of "blobs" in the array 1 of FIG. 5. To obtain a continuous trajectory, it is desirable that the vectors are generated at a rate which represents an oversampling relative to the rate of change of the speech parameters which they represent.

It is important to note that the shape of the trajectory is independent of any time warp (viz variation in rate) of the utterance and so conventional pattern recognition techniques can be used to determine from the trajectory the nature of the original utterance (although the intensity profile along the trajectory is related to time warp and loudness). FIG. 1 shows such a recognition unit 110.

The array described up till now produces, like that of Kohonen, only a distinct succession of high-output neurons, sometimes called "firings". Note however that use of the term firing does not *necessarily* imply a thresholding process.

Figure 3:
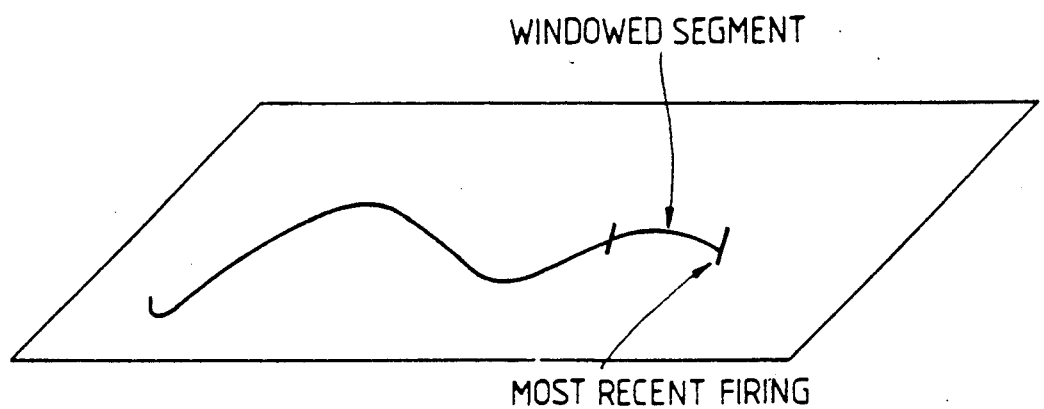
FIG. 3 illustrates a typical trajectory on a single array of the apparatus.

The firings due to several consecutive input vectors do not co-exist and so the trajectory is not visible as a whole at one time. However, if the trajectory is to be used, it must be visible as a whole at a single instant in time. If the system is taking in continuous speech, the trajectory of firings is as long as the speech has been going on, and would eventually become infinite in length. Obviously, it would be inappropriate to retain the entire arbitrarily long trajectory and make it input to the recognition process: so the trajectory is viewed through a window in time which only passes its most recent segment as shown in FIG. 3.

Figure 4A:
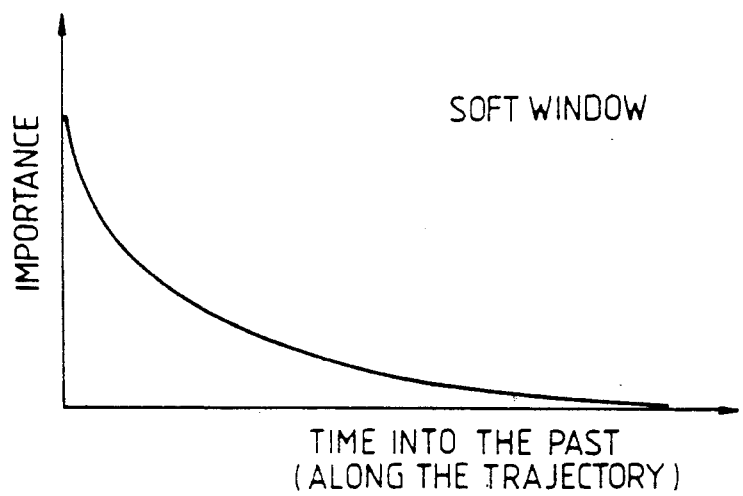
FIGS. 4A and 4B illustrate the forms of soft and hard windows respectively.
Figure 4B:
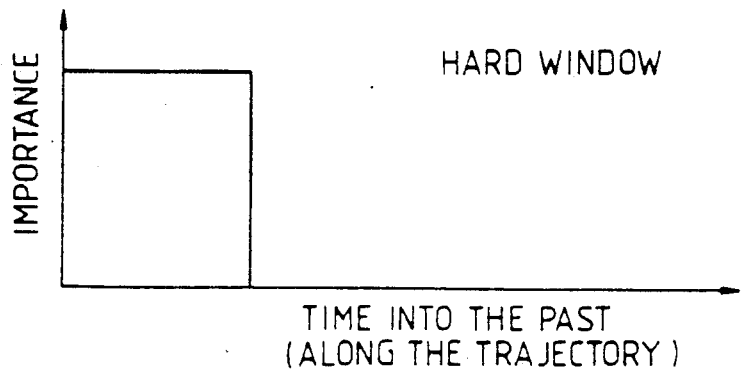

An appealing way of producing this window and at the same time making a complete section of the trajectory visible at a single instant in time is to build persistence into each neuron, i.e. once a neuron is stimulated by an input, it continues to produce an output of decaying magnitude even after the input has been removed. In general, the function may be exponential, linear, or any other function which approaches zero monotonically with time. If the decay is made exponential, then the system is using a "soft window" as shown in FIG. 4a (compare with the hard window of FIG. 4b).

The persistence function may be defined in the following way:

$$e_i^n = e_i^{n-1} * \beta + \eta_i^n$$

where $e_i^n$ is the excitation of the $i^{th}$ neuron at the $n^{th}$ sample time and $\beta$ determines the effective time constant of decay. This is indicated in FIG. 1 by the presence of R-C integrators 115 between the neuron outputs and the recognition unit 110. In one experiment, we have used a persistence factor $\beta$ of 0.99 and a sampling period of 10 ms which yields a decay time constant of approximately 1 second.

Figure 5:
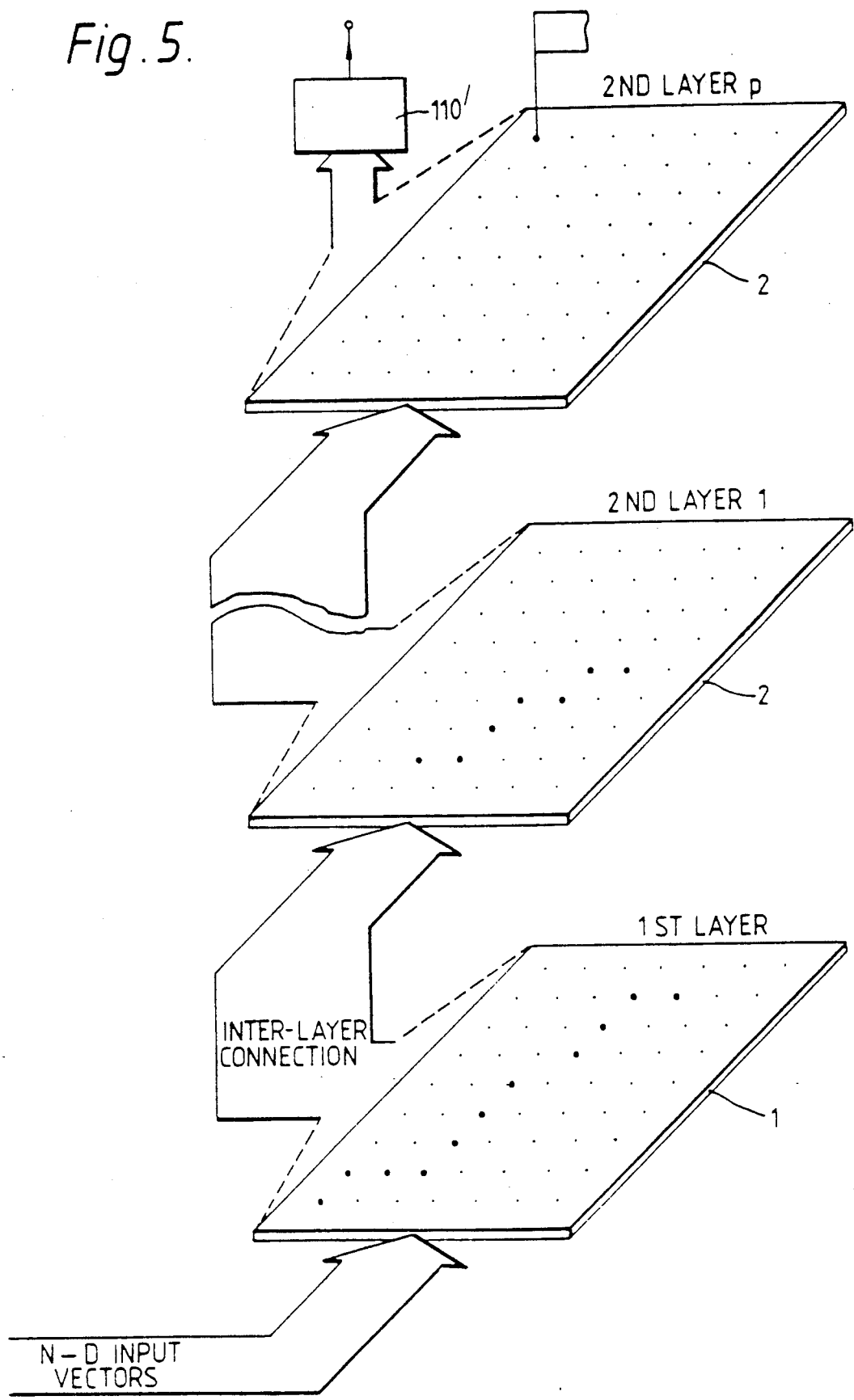
FIG. 5 illustrates schematically an embodiment with stacked arrays.

Although the arrangement illustrated in FIG. 1 is quite possible, the preferred method for achieving recognition is, as shown by the example in FIG. 5, to provide a plurality of arrays; p second layers 2 are arranged in series with the first layer 1. The idea behind the stack of neural arrays is to use the trajectory produced on the bottom layer as input to the second layer, which is so connected to the first layer that it produces a more compressed trajectory therein, and so on, up through the layers of the stack until a word or even a sequence of words generates a trajectory on a high layer which is so short that it can be associated with just one or a small group of neurons. The final recognition stage 110' then serves simply to identify that one or small localised group of neurons having the largest output. This neuron can be labelled explicity with the appropriate utterance.

It is then necessary to devise a scheme to present the windowed section of the trajectory on one array to the neurons of the next array.

One obvious solution would be to make a very large vector from the outputs of every neuron in one layer and present it as input to every neuron in the next layer.

However, for inter layer connections, this arrangement is unsuitable on two counts. First, there may be several tens of thousands of neurons in layer n, giving rise to an input vector to layer n+1 neurons whose dimensionality would also be tens of thousands—this would require around a billion inter layer connections, which is simply not physically possible.

The second reason for avoiding this scheme is that the inherent dimensionality of firing patterns derived from the whole of a layer is almost certain to be much greater than two, and hence it would be impossible to map them in an ordered manner onto the next layer which only has two dimensions.

Figure 6:
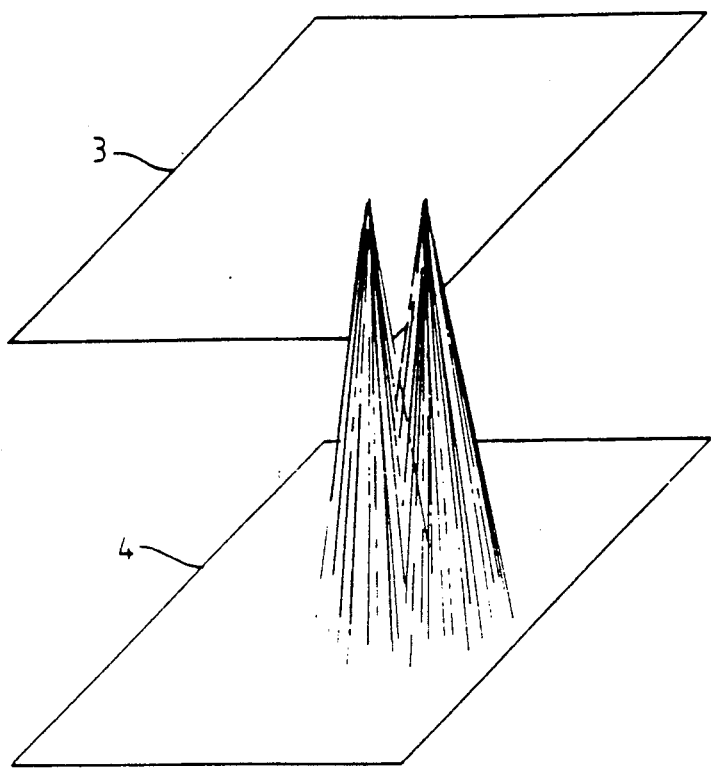
FIG. 6 illustrates a localised interconnection scheme between adjacent arrays of FIG. 5.

A solution avoiding both of these problems is illustrated in FIG. 6. Here the input vector to a neuron in a layer 3 and having co-ordinates (x,y) is derived from the outputs of a fairly small number of neurons in a layer 4 which lie within a small circle whose centre has the same coordinates (x,y). The circular regions in the layer 4 overlap, so that the inputs to neurons within a small locality in the layer 3 will be very similar, and the array in the layer 3 will become ordered after training in a similar way to an array which has a global input vector, except that the ordering will be *local* rather than global.

This connection strategy overcomes the problem of the numbers of interconnections. If layer 3 contains 10,000 neurons each of which is connected to 100 neuron outputs in the previous layer, then $10^6$ interconnections would be needed.

The developed neural array preferably has decaying persistence built into each element and this causes the trajectory of excited elements to be partially "frozen" on the array, such that at one instant in time the most recently stimulated element on the trajectory is most excited and all the other elements along the trajectory are also excited but with decreasing intensity. Thus the system described is able to transform a sequence of pattern vectors representing a process with variable time warp, to a single pattern of element excitation in the neural array. This single pattern is time warp independent if the excitation intensity profile along the array is ignored.

The patterns of excitation in the array can be expressed as a vector in many other ways, but, for example, could be a vector whose elements were the co-ordinates of the z most intensely excited elements in the array where z is some fixed number. Thus, another way in which the inputs to the neural elements of one layer may be derived from the outputs of the previous layer is as follows:

The outputs of all the neurons in the lower layer are thresholded with a threshold which has a value such that only those elements which lie approximately on the path of trajectories of excited elements in the lower layer produce an output. Alternatively, another form of non-linearity is made to act on the outputs of all elements in the lower layer. For example, the output of each element may be raised to the power m where m is greater than one. Imposing this type of non-linearity on the element outputs has the effect of accentuating the difference in excitation between elements which lie in the vicinity of a trajectory and those that do not lie near a trajectory.

Consider now the required persistence of a recogniser with two arrays.

If the time constant was made long, say several seconds, then the first layer trajectory would cover several words. The numbers of allowable permutations of even a few words taken out of a moderately sized vocabulary is immense and so there would be an enormous number of different trajectories, each of which would need to cause strong firing of a distinct neuron in the subsequent layer. The number of neurons required in the next layer would be unrealisable, either artificially or biologically.

At the other extreme, if the time constant is made so short that only the firing of the last neuron in the first layer was retained, no compression of trajectory in the second layer would be possible because the first layer has merely recoded the sequence of speech input vectors as a sequence of fired neuron co-ordinates—a 1:1 re-coding.

A sensible choice of time constant seems to be a little less than the length of the shortest word that will be encountered, about 200 mS. The consequence of this choice is that the trajectory produced by the shortest word will cause a trajectory on the second layer which has near zero length, i.e. just one small group of neurons will fire. Clearly, an alternative method would be to build the persistence into the inputs of the neurons in the second layer.

Where there are three layers, it may be convenient to build into the outputs of the second layer a longer persistence than exists in those of the first.

Figure 7:
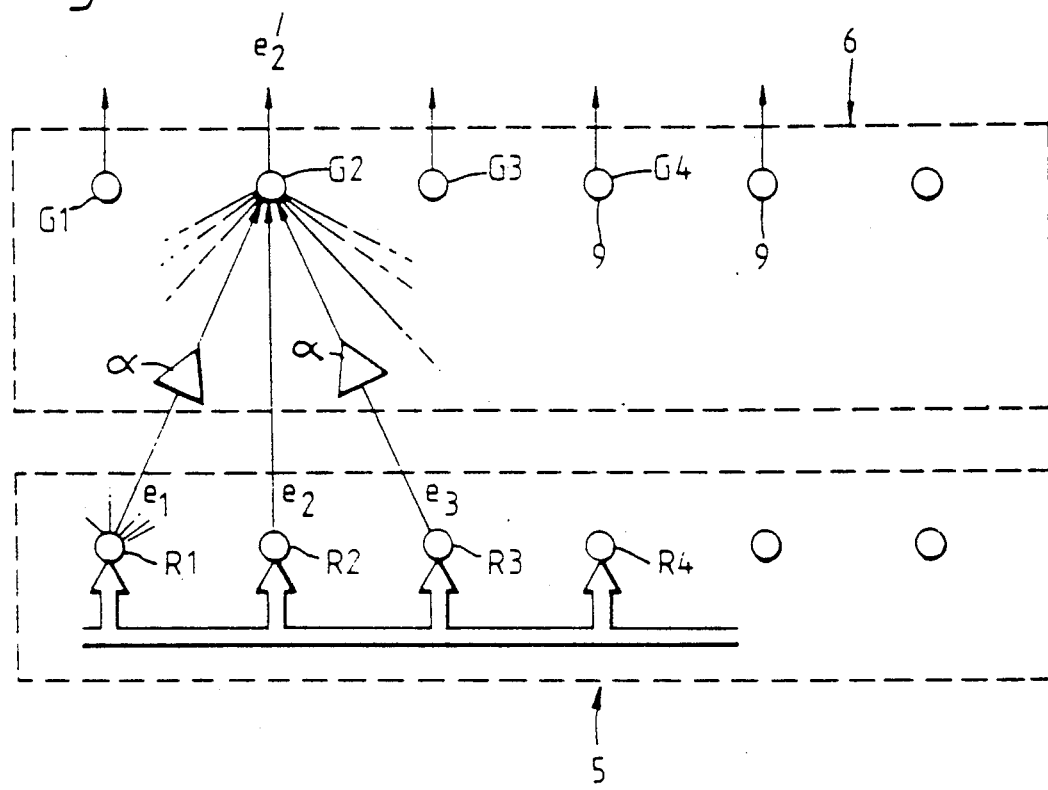
FIG. 7 illustrates an example of an array separated into two subsidiary layers to achieve intra-array grammar.

In further embodiments, certain concepts of grammar are built into the system. One method which we have devised for achieving this recognises that some trajectories are more likely to occur than others, and therefore biases the trajectories towards those preferred trajectories by cross-coupling within the layer. We separate at least the first layer 1 of FIG. 5 into two parts. The first part 5 (FIG. 7) is just a standard array with persistence so that at the $n^{th}$ sample instant the output of the $i^{th}$ neuron in this system is $e_i^n$:

$$e_i^n = \eta_i^n + e_i^{n-1} * \beta$$

The outputs of neurons in this array are fed after weighting (in multipliers 7) by stored factors of $\alpha_{ij}$ into the second part 6, an array of adding nodes 9 which sums $e_i$ for each neuron with the weighted outputs $e_{i,j}$, of the q neurons within a neighbourhood of the neuron in the previous array to give an overall neuron excitation of $e_i'$:

$$e_i'^n = e_i^n + \sum_{j=0}^{q-1} e_{i,j}^{n-1} * \alpha_{i,j}$$

where $e_{i,j}$ is the excitation of the $j^{th}$ one of the q neighbouring neurons.

The factors $\alpha_{ij}$ comprise grammar weights which tend to guide utterance trajectories along likely paths in the array, these paths being those expected in conventional speech. This therefore makes the shape of the path less dependent on speaker variation or background noise. Conceptually, the first part may be considered to be a topologically ordered array of "receptor neurons" while the second part 6 may be considered to be an array of "ganglion" neurons. It should be noted that the second part 6 is not ordered in the normal sense. Note that in FIG. 7, $e_{ij}^n$ is used rather than $e_{ij}^{n-1}$. Whether this is possible in practice will depend on the delays in the system.

The advantage of this arrangement is that it assists in enabling the system to learn primitive grammar.

The system works as follows: assume for the moment that all the weights, $\alpha$, between ganglions and receptors are zero. Say that a common sequence of excitation in the receptor array 5 is neuron R1 followed by neuron R2 (R denotes receptor and G ganglion). Excitation of R1 followed by R2 in the receptor array causes excitation of nodes G1 and G2 in the ganglion array 6. If the second input pattern to the receptor array 5 is corrupted in some way such that neuron R4 is fired instead of R2, then node G2 in the ganglion array will be correspondingly excited. Thus the system is unable to combat corruption or noise in the input patterns.

Assume now that $\alpha_{1,2}$ has a large value.

Consider what happens when the second corrupted input pattern is now applied to the receptor array 5: it excites neuron R4 which tends to excite node G4 in the ganglion array 6. However, the previously excited receptor neuron R1 is still excited due to persistence and is sending a strong signal via $\alpha_{1,2}$ to neuron G2 causing it to be excited. Thus the overall sequence of excitation in the ganglion layer will tend towards G1 followed by G2 even though the input was corrupted.

The receptor to ganglion connection weights are learnt from the application of a large number of pattern sequences. A typical learning algorithm might be:

$$\alpha_{i,j}^n = \alpha_{i,j}^{n-1} * \gamma + k_2 * e_i^n * e_{i,j}^{n-1}$$

where:
n is the sample time index,
$\gamma$ is a forgetting factor,
$k_2$ is a learning factor,
$e_i$ and $e_{i,j}$ are as defined above.

This can be implemented by the same auxiliary computer which deals with the weight vectors $W_i$, and in a similar manner.

Figure 8:
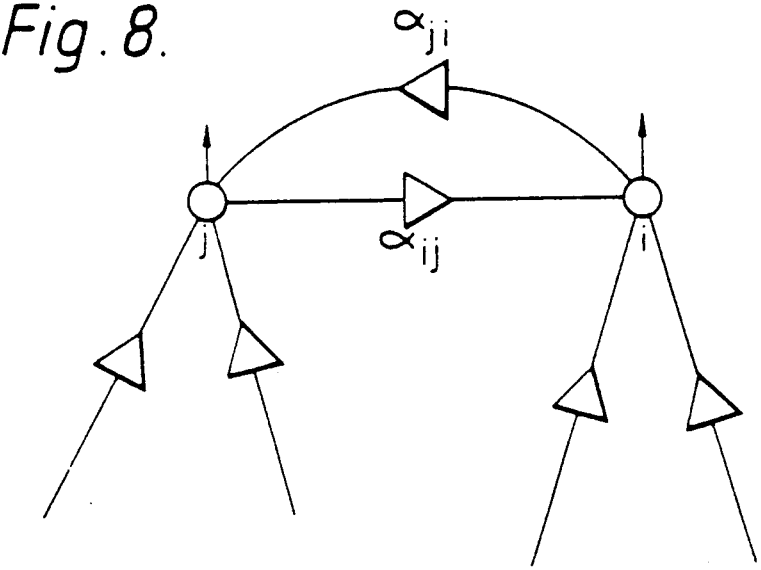
FIG. 8 illustrates a second example of an array which achieves intra-array grammar.

An alternative embodiment with means for introducing grammar into the system is illustrated schematically in FIG. 8. In this case, neurons i, j of each array are coupled by weights $\alpha_{i,j}$, $\alpha_{j,i}$ with their immediately surrounding neighbours. By suitably setting the values $\alpha$, a trajectory within a particular layer will follow a preferential route since the moderate stimulation of a neuron will cause large stimulating signals to be fed via the neural interconnections having large weights to the neighbouring neurons which will respond to these signals when processing the next input vector.

A typical learning algorithm for this system might be:

$$\alpha_{ij}^{n+1} = \alpha_{ij}^n * \gamma + k_2 * W_i * X^{k-1} * W_j * X^k$$

where $\gamma$, $k_2$, are as defined above, n is the update rate of the weight factors $\alpha$ and k is the update rate of the input vectors X.

In many cases, the trajectory produced by an utterance in the first layer 1 will be substantially continuous. However, not all trajectories will be fully continuous and will instead consist of a series of separated relatively short segments. This might occur, for example, in the first layer, as it receives a vowel-stop consonant-vowel ($V_1$-C-$V_2$) utterance.

There will be no neural firing during the stop consonant because it is by definition silence. The two vowels on either side of the stop will not in general be phonetically adjacent, and so, the trajectories they generate will not be contiguous on the array. Nevertheless, the allowable $V_1$-C-$V_2$ sequences in a particular language are limited and it is desirable to exploit this constraint such that the occurrence of a trajectory associated with ($V_1$-C) is used to "prime" the neurons which would lie on the trajectory for (C-V$_2$) and make them more likely to be excited than other groups of neurons.

Figure 9:
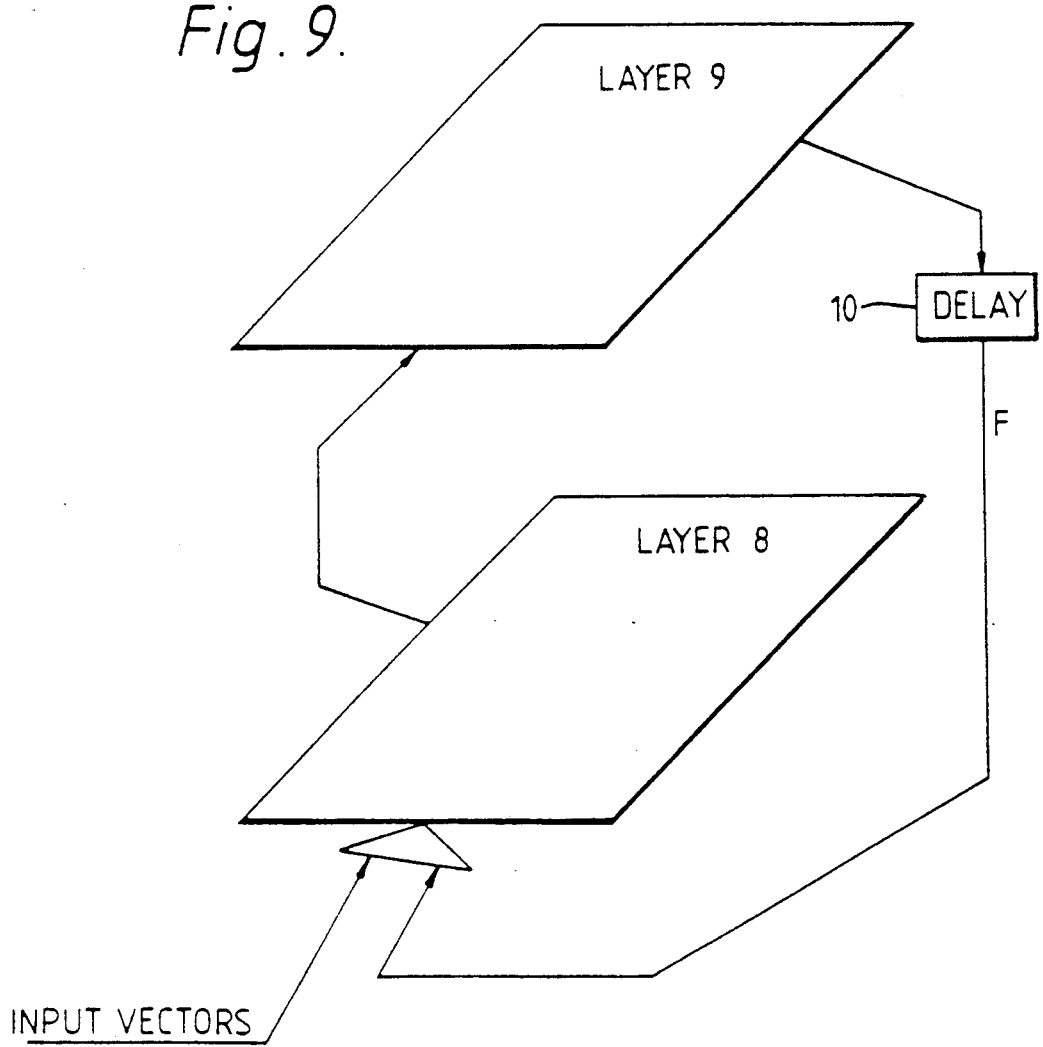
FIG. 9 illustrates the principle of interlayer grammar.

A scheme is shown in FIG. 9 in which the global firing pattern in a higher layer 9 is fed back and presented as an input vector to the layer 8 below along with the ordinary input vector. The scheme would operate on the (V$_1$-C) and (C-V$_2$) trajectories in the following way. The occurrence of the V$_1$-C trajectory on the layer 8 causes a compressed trajectory to occur on the layer 9 due to the forward inter-layer connection. This compressed trajectory is encoded in a vector, F which is fed back, with delay, to the input of the layer 8 where it is appended to the ordinary input vector, X, to form an overall input to the layer 9 of (X:F)=Q. In FIG. 9, the delay 10 is shown as a separate element in the system but in reality it is expected to be implicit in the neural arrays themselves. If the feedback delay is similar to the time of the stop between V$_1$ and V$_2$, then F actually gets to the input of the layer 8 at the same time as the vector X representing the start of V$_2$. Assuming that the self organisation of the layer 8 takes place with the feedback path active, its presence should become a necessary input component to cause the trajectory of (C-V$_2$) to be generated, i.e. The input vector X with null feedback vector would only cause weak excitation of the (C-V$_2$) trajectory, as would a null input vector appended by an active feedback vector. However, the joint occurrence of an active feedback, F, and input X should cause high excitation of the C-V$_2$ trajectory, since this is the input on which the system has been trained.

This feedback also has the result that recognition of a particular word will predispose lower layers to recognise the primitive sounds associated with the anticipated next word. The purpose of this predispositions to aid recognition of ill defined input patterns.

In an ideal system, the output from each layer would be fed back as an input to every previous layer. However, in practice this would lead to a totally unmanageable number of connections and inputs to each neuron. To achieve an approximation of this ideal arrangement, in the preferred example all or a part of each output signal from each layer above the first is fed back to the preceding layer so that the output of a high layer indirectly affects the inputs to all previous layers.

The operation of the system can be understood by considering a higher layer in which words are recognised and a lower layer in which phonemes are recognised. Say that a particular word has just been recognised in the word layer. This information is fed back and forms part of the input to the phoneme layer at the same time as the patterns corresponding to the phoneme of the next word are coming in.

The phoneme layer is trained on the combination of feedback pattern plus input pattern and so both are necessary to cause full excitation of the phoneme array neurons associated with the phoneme in the second word.

Now, imagine that the second word is heavily corrupted or does not even arrive as input to the phoneme layer. This layer will still be getting a partial input from the pattern fed back from the word layer and so will tend to excite neurons which would have been fully excited by the succession of phonemes in the second word if it had arrived. Thus, weak excitation representing the non-existent or corrupted second word will be generated. This form of error correction using knowledge of what is likely to happen in a sequence of patterns aids recognition of ill defined patterns.

These methods cannot be implemented in real-time for processes such as speech recognition except by using parallel processing arrays.

Figure 10:
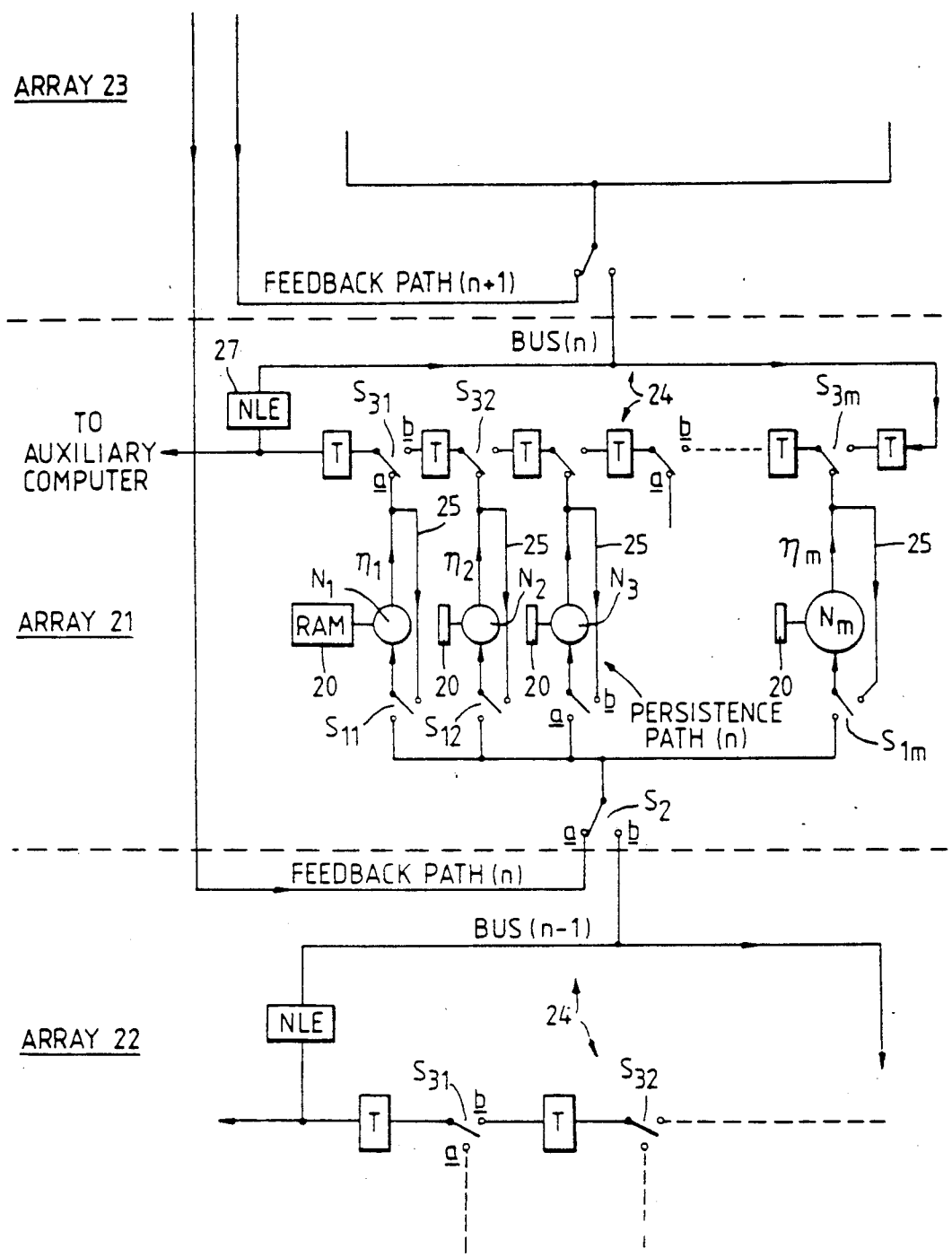
FIG. 10 illustrates an example specific hardware for the apparatus.

FIG. 10 illustrates the architecture of a neural array structure having m neural or computing elements $N_1 \ldots N_m$, each of which is associated with a respective local RAM 20. Each RAM stores synaptic weights for the associated neural element.

It should be noted that the arrangement shown in FIG. 10 enables the output signals from each neural element of one array to be supplied to each neural element of the next array.

In FIG. 10 one array 21 is shown in full while parts of the preceding array 22 and the succeeding array 23 are also shown.

Before explaining how the system works, define the required output of layer 21.

$$\eta_i^n = \eta_i^{n-1} * \beta + \sum_{r=1}^{m} x_r * w_{ir} + \sum_{r=1}^{m} y_r * c_{ir}$$

where x is the input vector from the layer 24 below (or, for the first layer, the input vector), $y_r$ is the feedback vector from the layer 23 above, and $\beta$, $w_{ir}$ and $c_{ir}$ are the persistence weight and feedforward and feedback synaptic weights respectively contained in the local RAM.

Operation of the system is as follows: Assume that the neurons $N_1$ to $N_m$ have just finished computing their respective outputs $\eta_1^{n-1}$ to $\eta_m^{n-1}$ which are stored in respective accumulators of the neural elements (not shown) and switch $S_2$ is set at position b. Switches $S_{31}$ to $S_{3m}$ are set to position a so that the neural outputs are loaded into the storage elements (T) of the output bus 24 of layer 21. At the same instant switches $S_{11}$ to $S_{1m}$ are set to position b so that each neuron's output $\eta_i^{n-1}$ is connected to its input along the persistence path 25 and the accumulators are cleared. At this instant all the neurons start computing the first component of their output—i.e. the persistence terms, which for neuron $N_i$ is $\eta_i^{n-1}*\beta$. So the neurons have just worked out the first term in the above expression which is stored in respective accumulators. $\beta$ is obtained from the RAM 20 associated with each neuron.

Switches $S_{31}$ to $S_{3m}$ of all the arrays now move to position b and switches $S_{11}$ to $S_{1m}$ switch to position a such that the first value, $x_1$, stored on the feed forward bus of layer 22 is applied to the inputs of all neurons in layer 21 simultaneously while the appropriate synaptic weights $w_{11}$ to $w_{m1}$ are drawn from each neuron's local RAM. (At the same time, the first value on the feed forward bus of layer 21 is being applied to the inputs of neurons in layer 23 and so on, up through the stack of arrays).

At this point the next component in each neuron's output is computed within the neuron and is $x_1.w_{i1}$ and is added to the contents of the accumulator.

The feed forward bus 24 on each array is then "clocked" along one place so that the next value, $x_2$, from the array is applied to all neurons in the next array, and the next partial output $x_2.w_{i2}$ is computed and added to the previous partial output in the accumulator of each neuron. This process is continued until the feed forward bus has been completely circulated.

Next switch $S_2$ is moved to position a and the process is repeated with $y_1$ to $y_m$ is turn as inputs. These are values fedback from the output bus of a higher layer along feedback path 26.

On completion of this process each neuron has computed a new output value $\eta_i{}^n$ stored in the accumulator and the entire process re-commences.

The non-linearity processor 27 in series with the output bus 24 of each array is optional. Its function, if included, is to threshold, or raise to a power, the values stored on the bus.

The system shown in FIG. 10 could be realised digitally with all synaptic weights being represented, for example, by eight bit words and the neuron output and input signals also being represented by eight bit words. The circulation of data on the output bus, feedback path and persistence paths would all be done serially to minimise the amount of hardware associated with each neuron and also the number of interconnection conductors between neurons. Therefore each storage element, T, in the output bus 24 will consist of an eight bit SISO shift register.

FIG. 10 tacitly assumes that the output of all the neurons of an array form the input for the next layer. As explained above, this is often unrealistic; however, the architecture of FIG. 10 can readily be modified by connecting groups of neurons to separate buses corresponding to the local groupings illustrated in FIG. 4.

Figure 11:
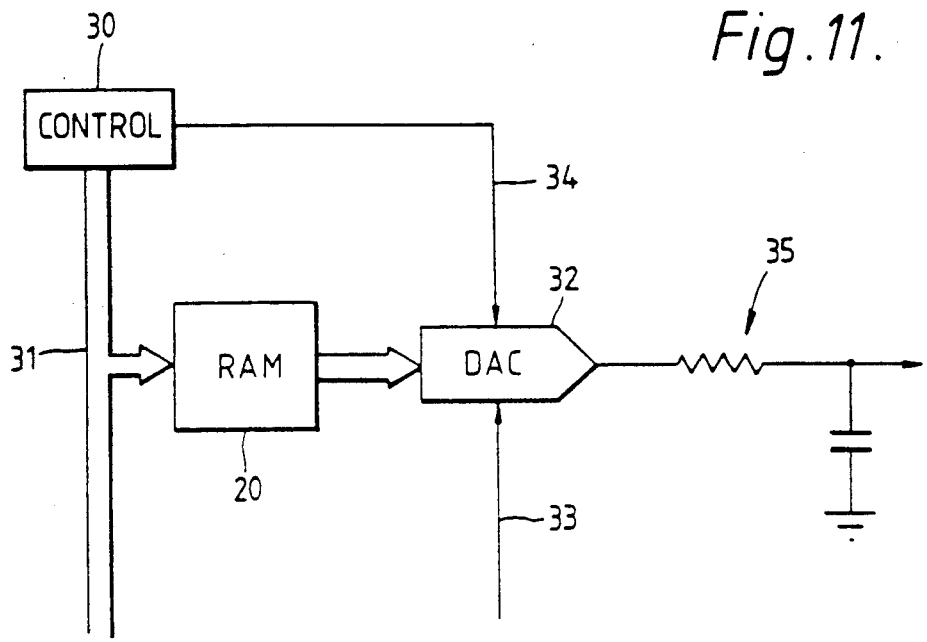
FIGS. 11 and 12 illustrate a hybrid realisation of a neural element for use in the arrangement of FIG. 10.

FIG. 11 illustrates a hybrid analogue/digital realisation of a computing element which may be used in the arrangement of FIG. 10. In this case, all synaptic weights are stored digitally in the RAM 20 which is addressed from a control circuit 30 via an address bus 31. Digital values from the RAM 20 are fed to a multiplying digital-to-analogue converter (DAC) 32 which also receives via an input line 33 the analogue input signal from the respective switch $S_{11}$-$S_{1m}$. Operation of the DAC 32 is controlled by clock signals generated by the control circuit 30 and fed along a control line 34. The DAC 32 may be realised for example by a switched R-2R ladder or ramp comparator. In this case, the accumulator 35 associated with the computing element is formed by a R-C leaky integrator.

In this example, each storage element T in the serial bus will be realised by a single stage clocked analogue shift register to which clock signals are supplied from the control circuit 30. This shift register could be a charge-coupled device, a bucket brigade line or sample and hold circuit. In addition, all signal values in this system will be represented by analogue voltages and be circulated on the serial output bus 24 and feedback paths in pulse amplitude modulation.

Figure 12:
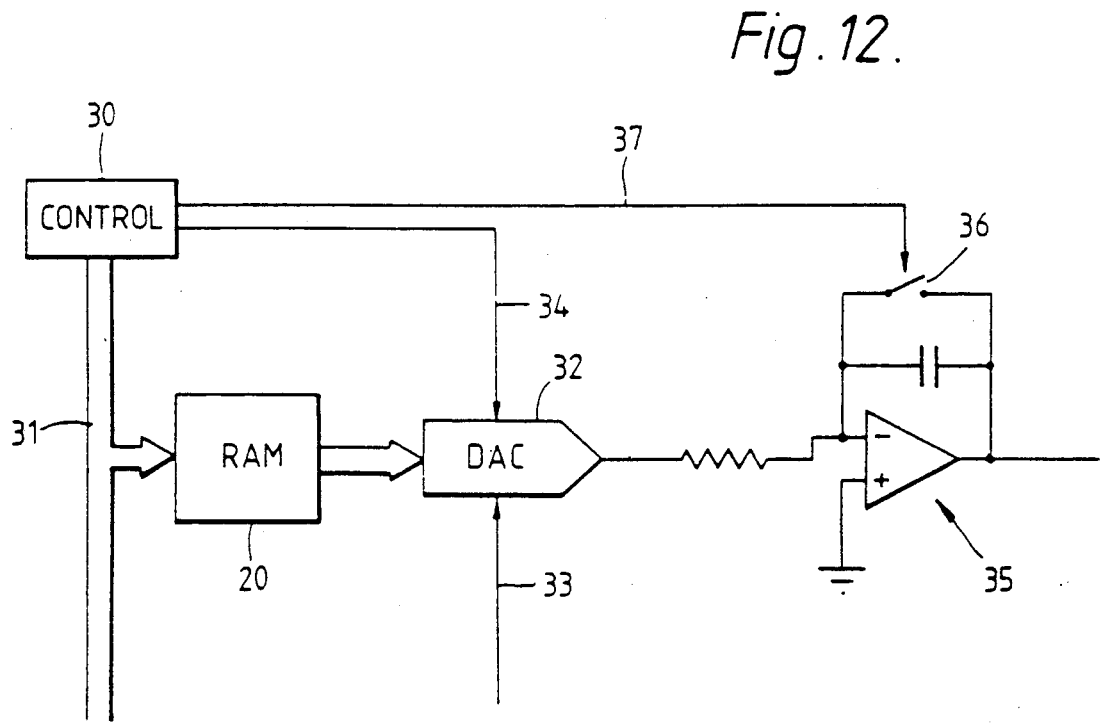

FIG. 12 illustrates a modification of the FIG. 11 example in which the accumulator 35 is formed by a resettable analogue integrator with a switch 36 controlled via a control line 37 by the control circuit 30.

Figure 13:
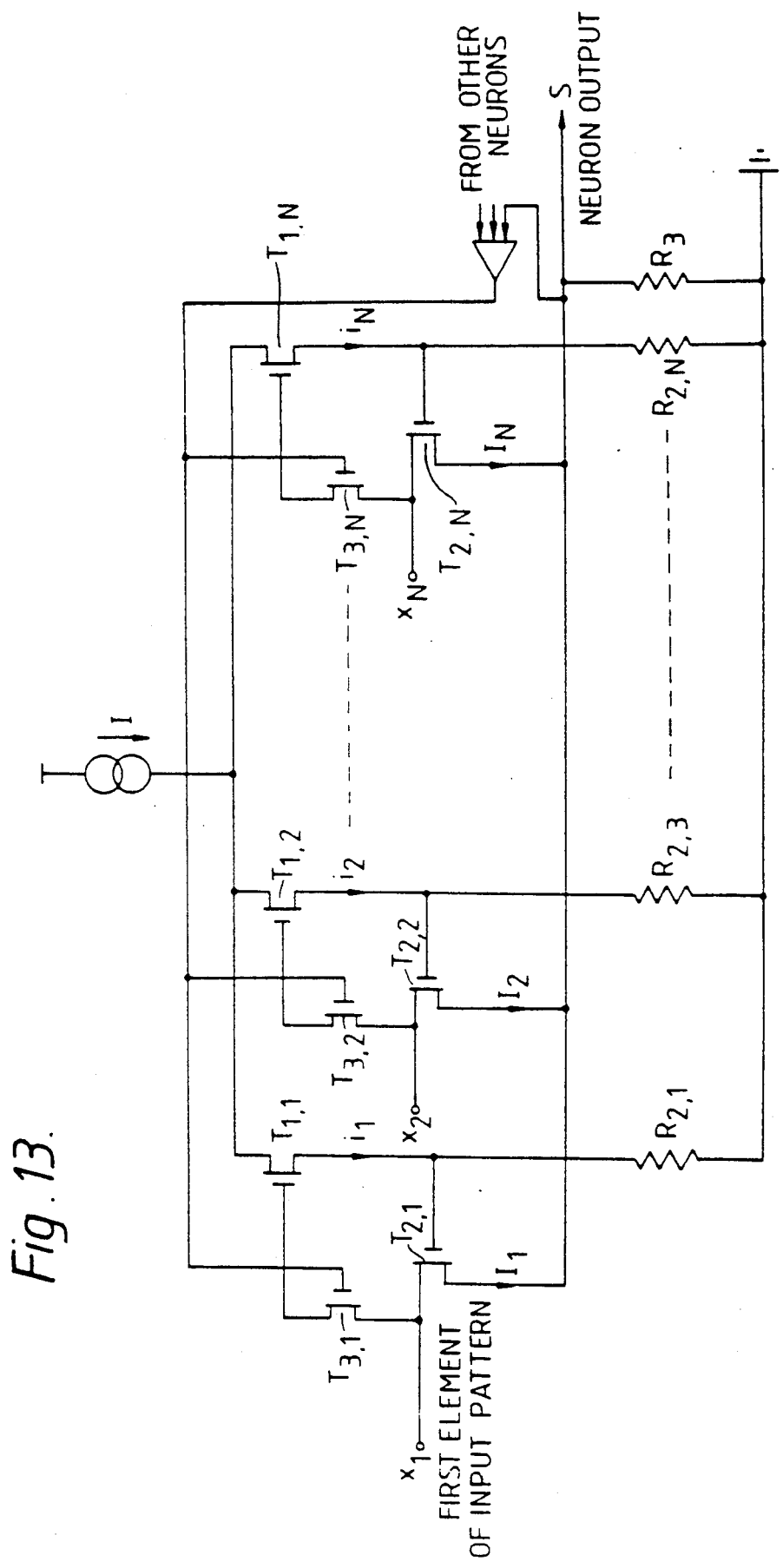
FIG. 13 illustrates a pure analogue realisation of a neural element.

FIG. 13 illustrates a pure analogue realisation of a neural element. In this version, the serial bus structure of FIG. 10 is abandoned. It is assumed that the outputs of neurons in one layer are physically connected to the inputs of neurons in the next layer. The voltages representing each element of a pattern vector applied to the bottom array in the stack are applied in parallel to the inputs of each neuron in that array, i.e. if the pattern vector has 30 elements, then each neuron is the bottom array must have 30 parallel inputs. The analogue circuitry enables the synaptic weight to be updated in real time without the use of an auxiliary computer. The system is entirely self-sufficient.

The signal inputs to the neuron are $x_1 \ldots x_N$.

These voltages cause currents $I_1$ to $I_N$ to flow into a summing point P. The magnitude of each current is $$I_j = x_j / R_{DSj}$$

where $R_{DSj}$ are the drain source resistance of transistors $T_{2j}$. The factor $1/R_{DSj}$ is therefore effectively the jth synaptic weight of the neuron and the total current at the summing point P is therefore proportional to the output of the neuron. (This total current is converted to a voltage by passing it through a resistor $R_3$).

The magnitude of the resistance $R_{DSj}$ is controlled by the voltage applied to the gate of transistor $T_{2j}$ which in turn is controlled by the current flowing through $T_{1j}$. The current through $T_{1j}$ depends on the amount of charge stored on its gate which in turn is supplied via $T_{3j}$ from the signal input voltage $x_j$.

Thus, if $x_j$ is frequently large, the gate of $T_{1j}$ will become charged, causing increased current flow, $i_j$, which increases the voltage on the gate of $T_{2j}$, reducing the drain-source resistance of this transistor and thereby increasing the effective value of the jth synaptic weight. For the whole neuron, the synaptic weight vector is modified after a time $\Delta t+$ to become:

$$W(t+\Delta t) = W(t) + L\Delta t.$$

Now, according to the ordering algorithm for the array, only synaptic weight vectors of those neurons which are in the neighbourhood of the most strongly excited neurons should be modified. This is achieved in this circuit by controlling the flow of current to the gate of $T_{1j}$ by using the sum (from a summation unit A) of the output of the neuron and the outputs of adjacent neurons in the array (i.e. those in whose neighbourhoods the neuron lies) to control the voltage on the gate $T_{3j}$ which controls the flow charge onto the gate of $T_{1j}$. In other words, the factor L in the previous expression is the aggregate excitation of all the neurons in a particular part of the array.

A second point to consider is that the ordering algorithm specified only works if the magnitude of the synaptic weight vector is always kept at unity. This is achieved in the analogue circuit by deriving the currents $I_1$ to $I_N$ from a single current source, I, such that:

$$I = \sum_{j=1}^{N} I_j$$

The synaptic weights are proportional to $I_j$ and so $$\sum_{j=1}^{N} w_j = \text{constant}$$

This means that the magnitude of the weight vectors is a constant in a City Block sense rather than Euclidean sense. However, simulation has shown this to be satisfactory.

Several learning processes have been discussed above. Although in principle it may be possible to run at least some of them simultaneously, it is envisaged that a more orderly approach would be to follow a sequence such that the neuron weights W are learned before the grammar weights $\alpha$ (if used), and that each layer is trained before a higher layer is trained. Thus we may have a sequence:

(a) learn weights $W_i$ of first layer.
(b) learn weights $\alpha_{ij}$ of first layer.

(c) learn weights $W_i$ of second layer.
(d) learn weights $a_{ij}$ of second layer.
(e) learn feedback weights c between second and first layers (if feedback is provided).
(f) continue for third and subsequent layers.

I claim:

1. A pattern recognition apparatus comprising:
   an input for receiving a temporal sequence of input signal vectors;
   a store means for storing a plurality of reference vectors;
   an array including a plurality of comparison elements coupled to the store means and arranged in operation to each receive each input vector in the temporal sequence and to generate, for each said input vector when said input vector is currently at the input, an output signal indicative of the degree of similarity between said current input vector and a respective one of the reference vectors from the store means;
   modification means for producing for each element a modified output dependent on the output signal previously produced by that element as a result of a comparison between the reference vector for that element and at least the immediately preceding input vector in the temporal sequence; and
   recognition means for comparing a pattern defined by said modified outputs with reference pattern information in order to identify a corresponding pattern in the said temporal sequence.

2. A pattern recognition apparatus according to claim 1, in which the modification means is arranged to produce for each element a modified output which is the sum of the output of that element for a current input vector and a plurality of earlier outputs of that element for preceding input vectors, each earlier output being multiplied by a value selected such that each earlier output is accorded a weight which is a monotonically decreasing function of the time which has elapsed between that earlier output and the output for the current vector.

3. A pattern recognition apparatus according to claim 2, in which the monotonically decreasing function is a decaying exponential and the modified signal is given by:

$$e_i^n = e_i^{n-1} * \beta + \eta_i^n$$

where $e_i^n$ and $n_i^n$ are respectively the modified and unmodified outputs of the $i^{th}$ element at the $n^{th}$ sample time and $\beta$ determines the effective time constant of decay.

4. A pattern recognition apparatus according to claim 1 in which the store means contains reference vectors generated by"
   applying to the input a training sequence of signal vectors;
   for each input vector:
      identifying that element which has an output indicating the greatest similarity between input and reference vectors; and
      applying to the reference vectors of the identified element and those elements lying, in a notional array space, within a defined neighbourhood of that element an adjustment to increase the similarity between those reference vectors and the input signal vector,
   whereby the reference vectors represent a topological mapping of the statistical variations in the input vectors of the training sequence.

5. A pattern recognition apparatus according to claim 1 including control means arranged in operation during the application of a training sequence of signal vectors to the said input to perform the steps of:
   for each input vector:
      identifying that element which has the output indicating the greatest similarity between input and reference vectors; and
      applying to the reference vectors of the identified element and those elements lying, in a notional array space, within a defined neighbourhood of that element an adjustment to increase the similarity between those reference vectors and the input signal vector,
   whereby the reference vectors represent a topological mapping of the statistical variations in the input vectors of the training sequence.

6. A pattern recognition apparatus according to claim 1 including means for producing for each element a further modified output which is the sum of the modified output of that element and a weighted sum of the modified outputs of selected other elements.

7. A pattern recognition apparatus according to claim 6, in which the weights employed in forming the said weighted sum have been generated by applying a training sequence of signal vectors to the input and iteratively adjusting the value of the weight to be employed between each element and each of said respective other elements by an amount dependent on the product of outputs produced by those two elements.

8. A pattern recognition apparatus according to claim 6, including control means arranged in operation during the application of a training sequence of signal vectors to the said input to iteratively adjust the value of the weight to be employed between each element and each of said respective other elements by an amount dependent on the product of outputs produced by those two elements.

9. A pattern recognition apparatus according to claim 1 or 6, in which said modified or further modified outputs are subjected to a non-linear operation to enhance outputs indicative of high similarity relative to those outputs indicative of lower similarity.

10. A pattern recognition apparatus according to claim 1 or 6, in which the recognition means comprises at least one further array of such comparison elements having respective stored reference vectors, each such element being connected to receive a respective group of the modified outputs of the or a preceding array so as to generate an output signal indicative of the similarity between that element's respective reference vector and said group of outputs.

11. A pattern recognition apparatus according to claim 10, arranged to feed back the output signals generated by one or more of the arrays so as to modify a succeeding input signal vector, or a succeeding group of signals, fed to the or a preceding array.

12. A pattern recognition apparatus according to claim 1, in which the reference vectors are normalized such that the element which produces an output indicative of the greatest similarity between the input vector and its reference vector does not change with changes in magnitude of the input vector.

13. A pattern recognition apparatus according to claim 12, in which each comparison element is adapted to produce an output which is, or is a function of, the dot product of that element's respective reference vector and the input vector.

14. A pattern recognition apparatus according to claim 13, in which each element, for receiving an N-dimensional electrical signal vector value, comprises a plurality N of sections, each section having:
an input;
a variably conductive path between that input and a current summing node to form an output;
a storage transistor comprising an insulated gate field effect transistor arranged to control the conductivity of the path in dependence on the amount of charge stored on the gate of said transistor; and
means for adjusting the said stored charge in dependence on the output of the element and the outputs of neighbouring elements.

15. A pattern recognition apparatus according to claim 14, in which the conductive path is formed by a further transistor and the storage transistor is connected to supply a proportion of the current from a single constant current source to control the conductivity of the further transistor, whereby the algebraic sum of the conductivity of all said further transistors in an element is substantially constant.

16. A speech recogniser comprising a pattern recognition apparatus according to claim 1, including speech processing means operable to analyze speech input in each sampling period of a temporal sequence of sampling periods and to generate for each such period a plurality of parameters representative of the speech input in said period, said parameters forming the components of each input signal vector in the temporal sequence as input to the pattern recognition apparatus.

17. A speech recogniser according to claim 16, in which the duration of the sampling periods is selected sufficiently short such that the parameter values change slowly relative to the sampling frequency.

18. A pattern recognition apparatus comprising:
an input for receiving a temporal sequence of input signal vectors;
an array comprising a plurality of comparison elements, each element having an output and a plurality of inputs connected in parallel with the inputs of other of the comparison elements so that each element can receive each input vector;
store means for storing a plurality of reference vectors and coupled to the comparison elements; each comparison element being arranged in operation to produce at its output a signal indicative of the similarity between each input vector and a respective one of the reference vectors; wherein each element is adapted to produce an output which is, or is a function of, the dot product of the input and reference vectors modified in dependence on the output signal produced by that element as a result of a comparison between that element's respective reference vector and at least the immediately preceding input vector, and the reference vectors are normalized such that the element which produces an output indicative of the greatest similarity between the input vector and its reference vector does not change with changes in magnitude of the input vector.

19. A pattern recognition method comprising:
receiving a temporal sequence of input signal vectors;
storing a plurality of reference vectors;
at each of plural comparison elements arranged in an array, generating, for each said input signal vector in the temporal sequence currently applied to each comparison element, an output signal indicative of the degree of similarity between said current input vector and a respective predetermined reference vector;
producing for each element a modified output dependent on the output signal previously produced by that element as a result of a comparison between the reference vector for that element and at least the immediately preceding input vector in the temporal sequence; and
comparing a pattern defined by said modified outputs with reference pattern information in order to identify a corresponding pattern in the said temporal sequence.

20. A pattern recognition method according to claim 19, including producing for each element a modified output which is the sum of the output of that element for a current input vector and a plurality of earlier outputs of that element for preceding input vectors, each earlier output being multiplied by a value selected such that each earlier output is accorded a weight which is a montonically decreasing function of the time which has elapsed between that earlier output and the output for the current input vector.

21. A pattern recognition method according to claim 20, in which the monotonically decreasing function is a decaying exponential and the modified signal is given by:

$$e_i^n = e_i^{n-1} * \beta + n_i^n$$

where $e_i^n$ and $n_i^n$ are respectively the modified and unmodified outputs of the $i^{th}$ element at the $n^{th}$ sample time and $\beta$ determines the effective time constant of decay.

22. A pattern recognition method according to claim 19, in which reference vectors are generated by:
applying as the input a training sequence of signal vectors;
for each input vector;
identifying that element which has an output indicating the greatest similarity between input and reference vectors;
applying to the reference vectors of the identified element and those elements lying, in a notional array space, within a defined neighbourhood of that element an adjustment to increase the similarity between those reference vectors and the input signal vector,
whereby the reference vectors represent a topological mapping of the statistical variations in the input vectors of the training sequence.

23. A pattern recognition method according to claim 19 including for each input vector:
identifying that element which has the output indicating the greatest similarity between input and reference vectors;
applying to the reference vectors of the identified element and those elements lying, in a notional array space, within a defined neighbourhood of that element an adjustment to increase the similarity between those reference vectors and the input signal vector, whereby the reference vectors represent a topological mapping of the statistical variations in the input vectors of the training sequence.

24. A pattern recognition method according to claim 19, including producing for each element a further modified output which is the sum of the modified output of that element and a weighted sum of the modified outputs of selected other elements.

25. A pattern recognition method according to claim 24, in which the weights employed in forming the said weighted sum have been generated by inputting a training sequence of signal vectors and iteratively adjusting the value of the weight to be employed between each element and each of said respective other elements by an amount dependent on the product of outputs produced by those two elements.

26. A pattern recognition method according to claim 24, including, during the input of a training sequence of signal vectors, iteratively adjusting the value of the weight to be employed between each element and each of said respective other elements by an amount dependent on the product of outputs produced by those two elements.

27. A pattern recognition method according to claim 19 or 24, in which said modified or further modified outputs are subjected to a non-linear operation to enhance outputs indicative of high similarity relative to those outputs indicative of lower similarity.

28. A pattern recognition method according to claim 19 or 24, including, for each element in at least one further array of comparison elements having respective stored reference vectors, each such element being connected to receive a respective group of the modified (or further modified) outputs of the or a preceding array, generating an output signal indicative of the similarity between that element's respective reference vector and said group of outputs.

29. A pattern recognition method according to claim 28, arranged to feed back the output signals generated by one or more of the arrays so as to modify a succeeding input signal vector, or a succeeding group of signals, fed to the or a preceding array.

30. A pattern recognition method according to claim 19, in which the reference vectors are normalized such that the element which produces an output indicative of the greatest similarity between the input vector and its reference vector does not change with changes in magnitude of the input vector.

31. A pattern recongnition method according to claim 30, in which each comparison element is adapted to produce an output which is, or is a function of, the dot product of that element's respective reference vector and the input vector.

32. A pattern recognition method comprising:
receiving a temporal sequence of input signal vectors;
at each of a plurality of comparison elements, each element having an output and a plurality of inputs connected in parallel with the inputs of other of the comparison elements, receiving each input vector;
storing a plurality of reference vectors and coupled to the comparison elements; each comparison element being arranged in operation to produce at its output a signal indicative of the similarity between each input vector and a respective one of the reference vectors; wherein each element is adapted to produce an output which is, or is a function of, the dot product of the input and reference vectors modified in dependence on the output signal produced by that element as a result of a comparison between that element's respective reference vector and at least the immediately preceding input vector, and the reference vectors are normalized such that the element which produces an output indicative of the greatest similarity between the input vector and its reference vector does not change with changes in magnitude of the input vector.

* * * * *